US012675622B1

(12) United States Patent
Clerkin et al.

(10) Patent No.: US 12,675,622 B1
(45) Date of Patent: Jul. 7, 2026

(54) SIGNOFF-SAFE MULTI-CORNER REDUCTION FOR STATIC TIMING ANALYSIS

(71) Applicant: Synopsys, Inc., Mountain View, CA (US)

(72) Inventors: Brian D. Clerkin, Lusk (IE); Subramanyam Sripada, Hillsboro, OR (US); Praveen Ghanta, Palo Alto, CA (US); Peivand Tehrani, Camarillo, CA (US); Xihui Li, Dublin (IE)

(73) Assignee: SYNOPSYS, INC., Sunnyvale, CA (US)

( * ) Notice: Subject to any disclaimer, the term of this patent is extended or adjusted under 35 U.S.C. 154(b) by 712 days.

(21) Appl. No.: 18/302,687

(22) Filed: Apr. 18, 2023

Related U.S. Application Data

(60) Provisional application No. 63/334,566, filed on Apr. 25, 2022.

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
CPC .................................................. G06F 30/3312
USPC ........................................................ 716/113
See application file for complete search history.

(56) References Cited

U.S. PATENT DOCUMENTS 8,701,063 B1 * 4/2014 Shrivastava ........ G06F 30/3312
716/108

* cited by examiner

*Primary Examiner* — Eric D Lee
(74) *Attorney, Agent, or Firm* — Laxman Sahasrabuddhe; Park, Vaughan, Fleming & Dowler LLP

(57) ABSTRACT

A first set of timing paths may be selected in an integrated circuit (IC) design. A first set of timing slack values may be calculated for the first set of timing paths across a first set of corners. A dominant corner may be selected in the first set of corners based on the first set of timing slack values. A second set of timing slack values for the dominant corner may be determined for a second set of timing paths in the IC design. A third set of timing slack values may be estimated for the second set of timing paths for non-dominant corners. The third set of timing slack values may be used to select a second set of corners for a timing path in the second set of timing paths, and circuit objects in the timing path may be marked with the second set of corners.

20 Claims, 7 Drawing Sheets

Path library
300

Number of
entries =
number of
paths ×
number of
corners

| Components | Cell Delay | Net Delay | Num elems | Start slew |
|---|---|---|---|---|
| Launch | b1(0.6) b2(0.3) | 0.1 | 10 | 0.671 |
| Capture | c1(0.2) b2(0.3) | 0.5 | 6 | 0.827 |
| Data | b1(0.3) c2(0.3) | 0.4 | 20 | 0.456 |

302     304     306     308

TNS

Curve 402
(TNS based on
full timing
results)

1%

1%

Curve 404
(predicted
TNS)

1%

Signoff ◄————— Intermediate stages ◄————— Early stages

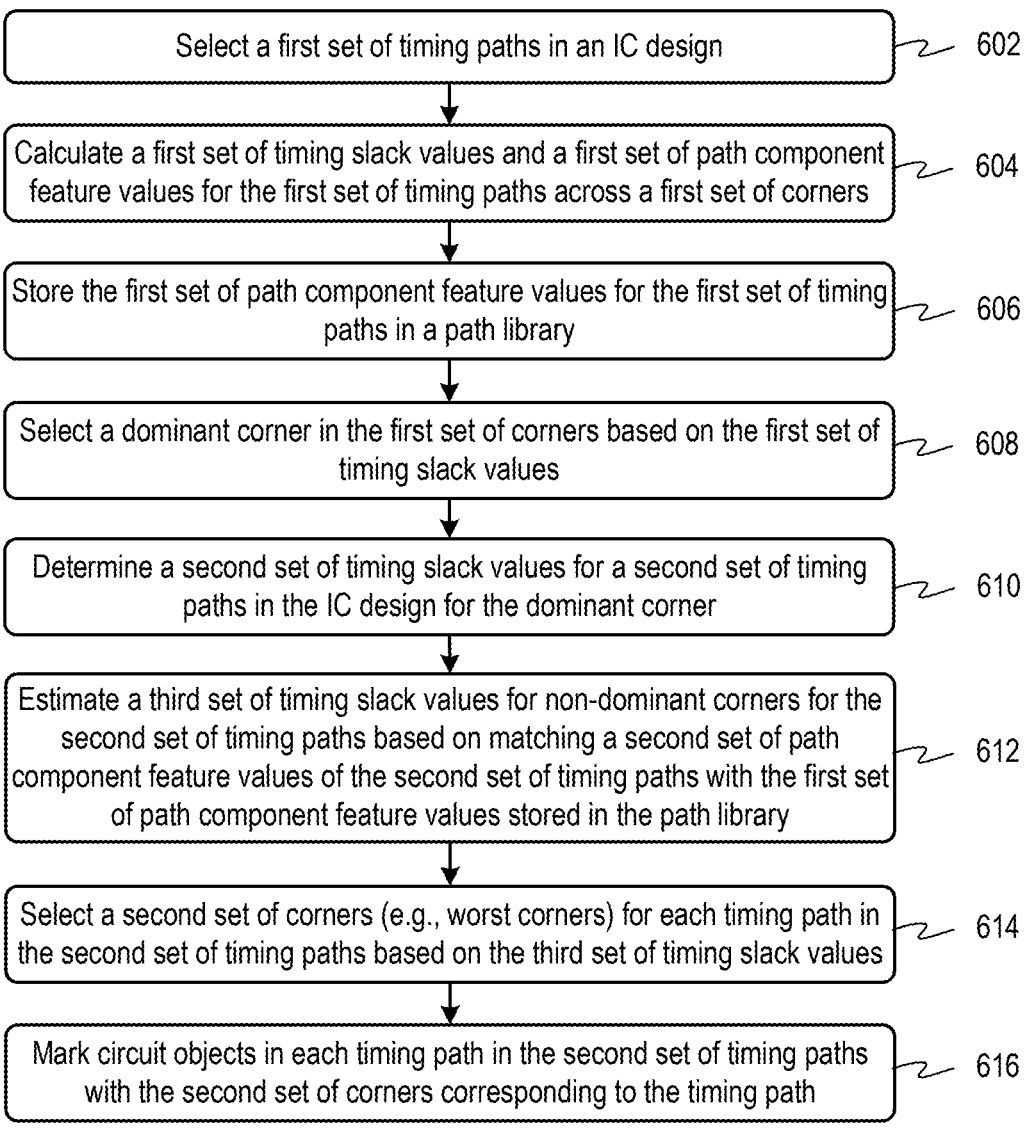

| Select a first set of timing paths in an IC design | 602 |

Calculate a first set of timing slack values and a first set of path component feature values for the first set of timing paths across a first set of corners — 604

Store the first set of path component feature values for the first set of timing paths in a path library — 606

Select a dominant corner in the first set of corners based on the first set of timing slack values — 608

Determine a second set of timing slack values for a second set of timing paths in the IC design for the dominant corner — 610

Estimate a third set of timing slack values for non-dominant corners for the second set of timing paths based on matching a second set of path component feature values of the second set of timing paths with the first set of path component feature values stored in the path library — 612

Select a second set of corners (e.g., worst corners) for each timing path in the second set of timing paths based on the third set of timing slack values — 614

Mark circuit objects in each timing path in the second set of timing paths with the second set of corners corresponding to the timing path — 616

FIG. 6

SIGNOFF-SAFE MULTI-CORNER REDUCTION FOR STATIC TIMING ANALYSIS

RELATED APPLICATION

This application claims the benefit of U.S. Provisional Application Ser. No. 63/334,566, filed on 25 Apr. 2022, the contents of which are herein incorporated by reference in their entirety for all purposes.

TECHNICAL FIELD

The present disclosure relates to integrated circuit (IC) design. More specifically, the present disclosure relates to signoff-safe multi-corner reduction for static timing analysis (STA).

BACKGROUND

STA may be used to analyze an IC design and determine timing slacks at one or more timing endpoints. The timing slacks may be used to determine if the IC design has timing violations, and the IC design may be modified to fix the timing violations. Advances in process technology and an almost unlimited appetite for computing and storage have created tight power, area, and timing constraints for IC designs.

SUMMARY

A first set of timing paths may be selected in an IC design. A first set of timing slack values and a first set of path component feature values may be calculated for the first set of timing paths across a first set of corners. The first set of path component feature values for the first set of timing paths may be stored in a path library. A dominant corner may be selected in the first set of corners based on the first set of timing slack values. A second set of timing slack values may be determined for a second set of timing paths in the IC design for the dominant corner. A third set of timing slack values may be estimated for the second set of timing paths across non-dominant corners in the first set of corners based on matching a second set of path component feature values of the second set of timing paths with the first set of path component feature values stored in the path library. A second set of corners may be selected for each timing path in the second set of timing paths based on the third set of timing slack values. Circuit objects may be marked in each timing path in the second set of timing paths with the second set of corners corresponding to the timing path.

In some embodiments described herein, timing information may be propagated to a circuit object in the IC design for corners marked for the circuit object.

In some embodiments described herein, an aggressiveness level may be determined based on the second set of timing slack values, where the second set of corners may be selected based on the third set of timing slack values and the aggressiveness level.

In some embodiments described herein, the second set of corners may include more corners when the aggressiveness level is low than when the aggressiveness level is high.

In some embodiments described herein, the second set of corners may be selected using a cost function.

In some embodiments described herein, the second set of timing paths may include a greater number of timing paths than the first set of timing paths.

In some embodiments described herein, estimating the third set of timing slack values may include using a first machine learning model to determine a first result which indicates whether an error in a first timing slack value in the third set of timing slack values is less than a threshold value, and determining to use a second machine learning model based on the first result, where the second machine learning model predicts the first timing slack value in the third set of timing slack values.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

FIG. 6 illustrates a process for performing sign-off safe multi-corner STA in accordance with some embodiments described herein.

DETAILED DESCRIPTION

Figure 1:
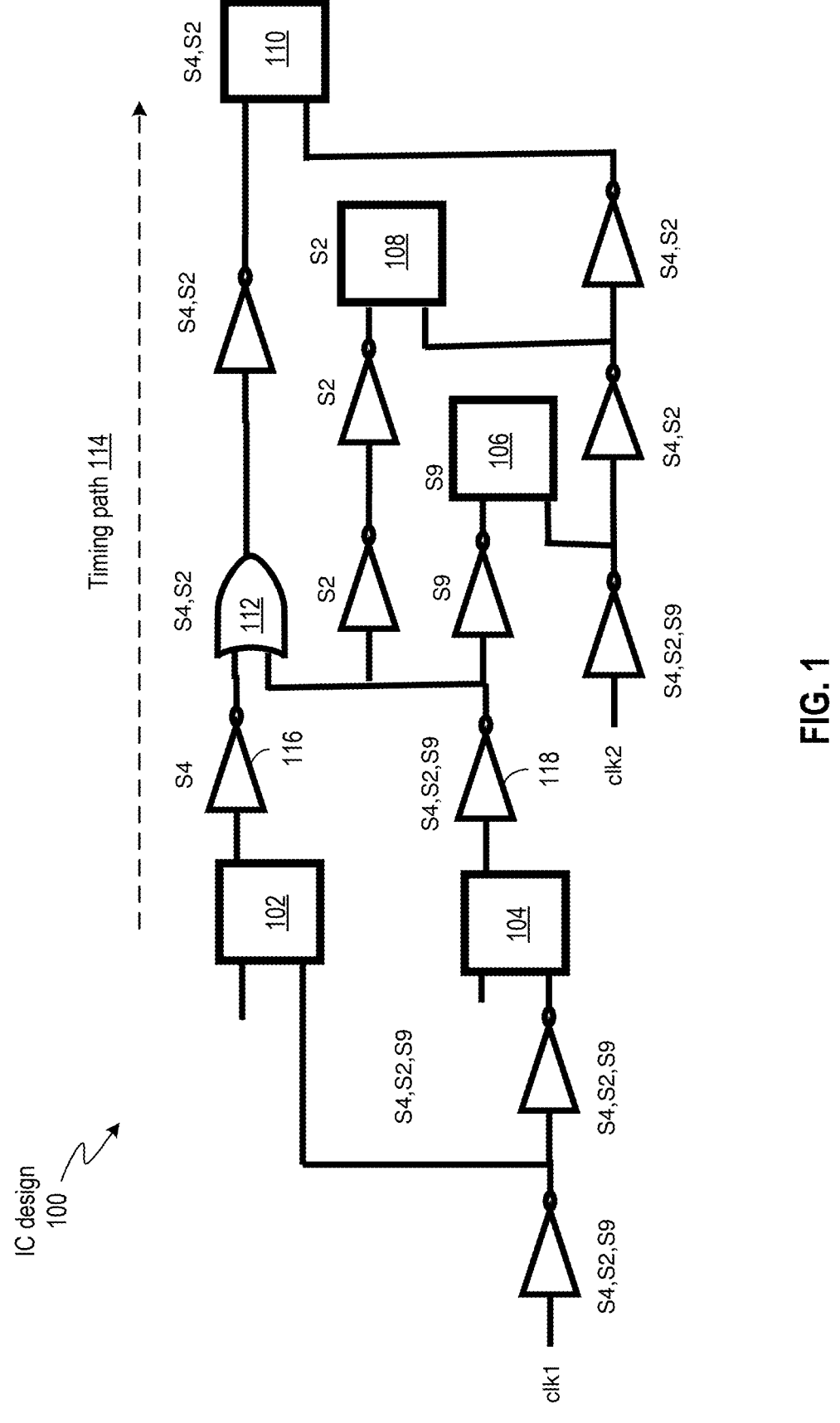
FIG. 1 illustrates objects in a set of timing paths marked using a set of corners in accordance with some embodiments described herein.

Aspects of the present disclosure relate to signoff-safe multi-corner reduction for STA. In this disclosure, the term "timing" may refer to a required time, an arrival time, or a timing slack (which may be a difference between the required time and the arrival time at a terminal in an IC design). The term "corner" may refer to a specific set of process and/or operating conditions which may affect the timing of devices and interconnects in the IC design. For example, the timing for an IC design determined by STA may be different at different process, voltage, and/or temperature corners. A separate STA run may be performed for each corner, and the results from the different corners may be collated to generate a single worst timing perspective for the IC design across the multiple corners. The term "worst timing" may refer to a timing value that is closest to violating a timing constraint (if the timing constraint is not violated) or that results in the greatest violation of the timing constraint (if the timing constraint is violated). For example, a hold timing constraint may be violated if the timing slack is less than a threshold value (e.g., zero). If the timing constraint is satisfied, then the "worst timing" may refer to the lowest positive timing slack. On the other hand, if the timing constraint is violated, then the "worst timing" may refer to the most negative timing slack.

Performing STA runs at multiple corners may be costly in terms of both runtime and compute resources and may be wasteful because most corners may not contribute to the worst timing. One approach for reducing the amount of computation is to determine a subset of corners which are likely to generate the worst timing. Since all corners may contribute to the worst timing picture, performing STA over only a subset of corners may result in an incomplete timing analysis, which may lead to missing timing violations and poorer design outcomes. In other words, performing STA over only a subset of corners may not be safe from a signoff perspective. The term "signoff" may refer to a last stage in an IC design flow where the timing of the IC design is verified. After signoff, the IC design may be manufactured. If a timing problem is identified after the IC design has been manufactured, then it can cause large financial losses because manufacturing may use a large amount of upfront capital. Therefore, it is important to ensure that timing signoff is safe.

Embodiments described herein analyze multiple corners efficiently by predicting the scope of analysis for each corner without sacrificing signoff safety. Specifically, embodiments described herein can perform STA for all the corners with fewer compute resources and faster throughput. Embodiments described herein may provide full STA coverage for all corners with acceptable differences in quality of results (QoR) when compared to a brute-force run that performs STA at each corner. Embodiments described herein are designed to be sign-off safe in that if no violations are reported by the embodiments, then no violations exist across all corners that are being considered. Embodiments described herein may predict the scope of the analysis that may be used for each corner (e.g., each PVT corner) to obtain full timing coverage across all corners.

Technical advantages of embodiments described herein include, but are not limited to, substantially reducing the computational effort used for performing STA across multiple corners (because the embodiments may perform STA computations only over those corners which are likely to have the worst timing). In addition, a small amount of computation is used for predicting the scope of the analysis. In some embodiments described herein, the amount of computational resources used for performing the analysis may be calculated dynamically, which may reduce wastage of computational resources.

The aggressiveness of the predictions may be automatically scaled back as the design gets closer to signoff. In this way the STA may become more accurate and computationally intensive as the number of violations decreases. Automatically scaling back the aggressiveness of the prediction is a highly desirable feature for fixing power and timing issues using an iterative engineering change order (ECO) process. Specifically, when embodiments detect that the IC design has close to zero timing violations, the embodiments may use very conservative predictions, which may avoid missing the worst timing corner and ensure that the resulting STA analysis is signoff safe.

When STA is performed across multiple corners, the worst timing slack for every timing path across all corners may be determined. A timing path may include a set of objects. An "object" in a timing path may refer to a device or interconnect. Examples of objects include, but are not limited to, pins, cells, and nets. If the worst corner for a set of timing paths is determined, then objects in the set of timing paths may be marked using the worst corner. Since an object can be in multiple timing paths, the object may be marked with multiple worst corners.

FIG. 1 illustrates objects in a set of timing paths marked using a set of corners in accordance with some embodiments described herein.

IC design 100 may include registers 102, 104, 106, 108, and 110, which may be interconnected using logic gates and interconnects. A timing path may correspond to any signal path that is of interest. For example, timing path 114 may begin at an output of register 102, pass through a set of logic gates, and end at an input of register 110. Embodiments described herein may mark objects (e.g., logic gates or nets) with one or more worst corners using a lightweight and fast analysis. The analysis may be performed for different timing constraints, e.g., the analysis may be performed once for maximum timing analysis (which may be used to determine setup timing violations) and once for minimum timing analysis (which may be used to determine hold timing violations). For example, gate 112 may be marked with two worst corners "S4, S2" which is shown in proximity to gate 112 in FIG. 1. Similarly, other objects in IC design 100 may be marked with worst corners as shown in FIG. 1. For example, gate S4 may be marked with worst corner S4 and gate 118 may be marked with worst corners S4, S2, and S9.

The total amount of STA computations performed for IC design 100 may be substantially reduced because the STA computations (which may include, but is not limited to, calculating the arrival time, required time, and slack time) may be performed on an object for only the corners with which the object is marked. For example, STA computations on gate 112 may be performed for corners S4 and S2, but not for corner S9 (or any other corners).

For maximum timing analysis (which may be used to determine setup timing violations), the timing slack for a timing path may be defined as timing slack=required time-arrival time, i.e., the setup timing slack is equal to the required time minus the arrival time. For minimum timing analysis (which may be used to determine hold timing violations), the timing slack for a timing path may be defined as timing slack=arrival time-required time, i.e., the hold timing slack is equal to the arrival time minus the required time. The worst timing slack (setup or hold) at a terminal in the IC design across a set of corners may be the minimum timing slack value at the terminal across the set of corners.

The required time may be decomposed into a set of components, which may include, but are not limited to, (1) capture clock path arrival, (2) clock reconvergence pessimism arrival, (3) clock constraints, (4) clock uncertainty, (5) clock jitter, and (6) constraint time. The arrival time may be decomposed into a set of components, which may include, but are not limited to, (1) launch clock path arrival, and (2) data path arrival. These components may have different values in different corners. No single corner may produce the worst value for each component in the required and arrival times. Thus, for a given corner, some components may improve the timing slack and others may worsen the timing slack.

For a critical path, the worst corner for the arrival time may determine the slowest corner. However, the worst corner for the capture clock path arrival may be the fastest corner. Thus, the overall worst corner may depend on the analysis of all components across all corners. For example, a critical path with a short data path and a long capture path may have the fastest corner as the worst corner.

Figure 2:
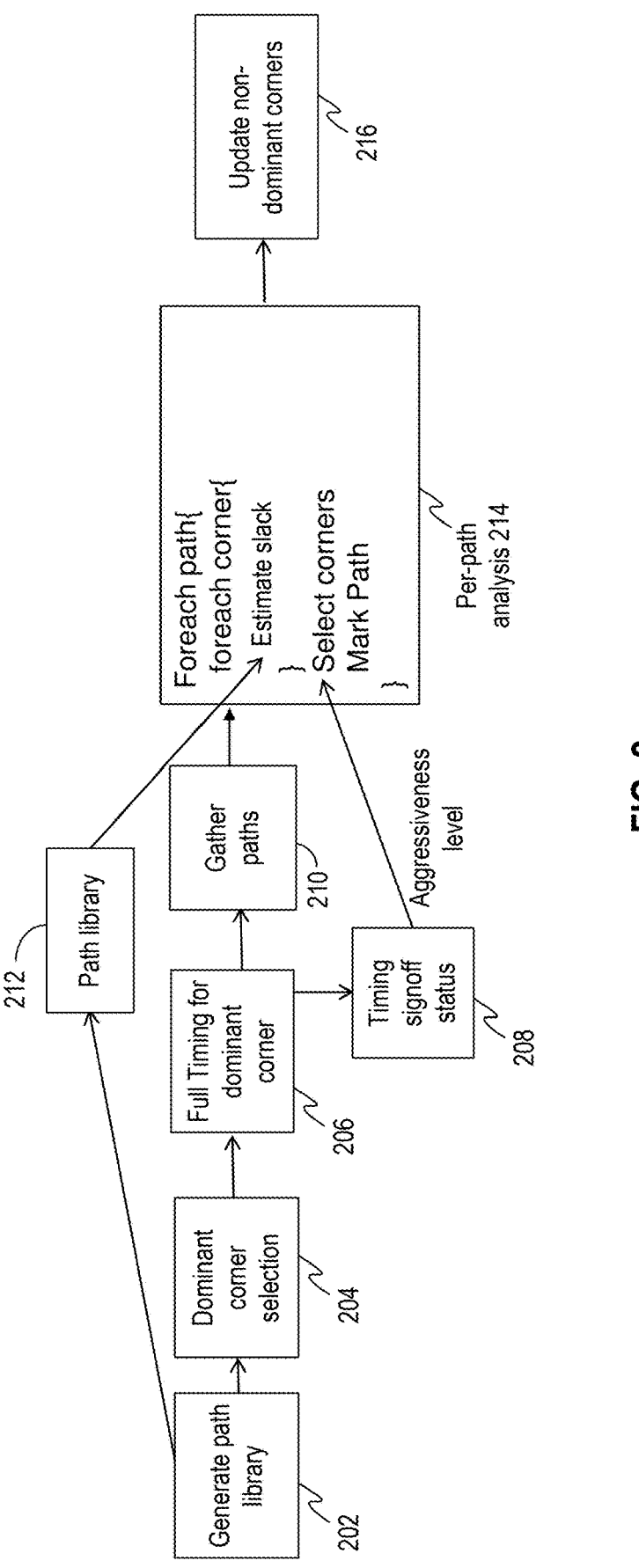
FIG. 2 illustrates a process for marking circuit objects with corners and updating timing information in an IC design using the marked corners in accordance with some embodiments described herein.

FIG. 2 illustrates a process for marking circuit objects with corners and updating timing information in an IC design using the marked corners in accordance with some embodiments described herein.

In the process shown in FIG. 2, if a single corner is fully timed, the other corner markings may be derived using a pre-calculated path library. Path library generation (at 202) may be performed to obtain path library 212. A first set of paths of interest may be selected in the IC design. The first set of paths may be selected without performing timing analysis or based on the timing of these paths. In other words, the first set of paths may not be selected based on the arrival times, required times, or timing slacks associated with the paths. Specifically, the paths may be selected to provide good coverage in terms of representation of all paths in the design. For example, paths may be selected to have different lengths, library cell contribution, rise/fall contribution, and parent blocks. The first set of paths may not cover or pass through each pin in the IC design. For example, none of the paths in the first set of paths may pass through the lower pin of gate 112 in IC design 100.

The first set of paths may be analyzed at all corners to obtain path-based accurate results for each path at all corners. Performing STA for the first set of paths across all corners may not be computationally costly because the number of paths in the first set of paths may be a small fraction of the total number of paths in the IC design.

Each path in the first set of paths may be divided into a set of components, which may include, but are not limited to, launch clock arrival, data arrival, capture clock arrival, constraint. If the clock paths have shared logic, then the clock arrival from the last common point may be calculated. For each component, the timing values (e.g., arrival time or constraint value) may be stored with features which describe the components. Examples of component features include, but are not limited to, path length and start slew library cell contribution.

Figure 3:
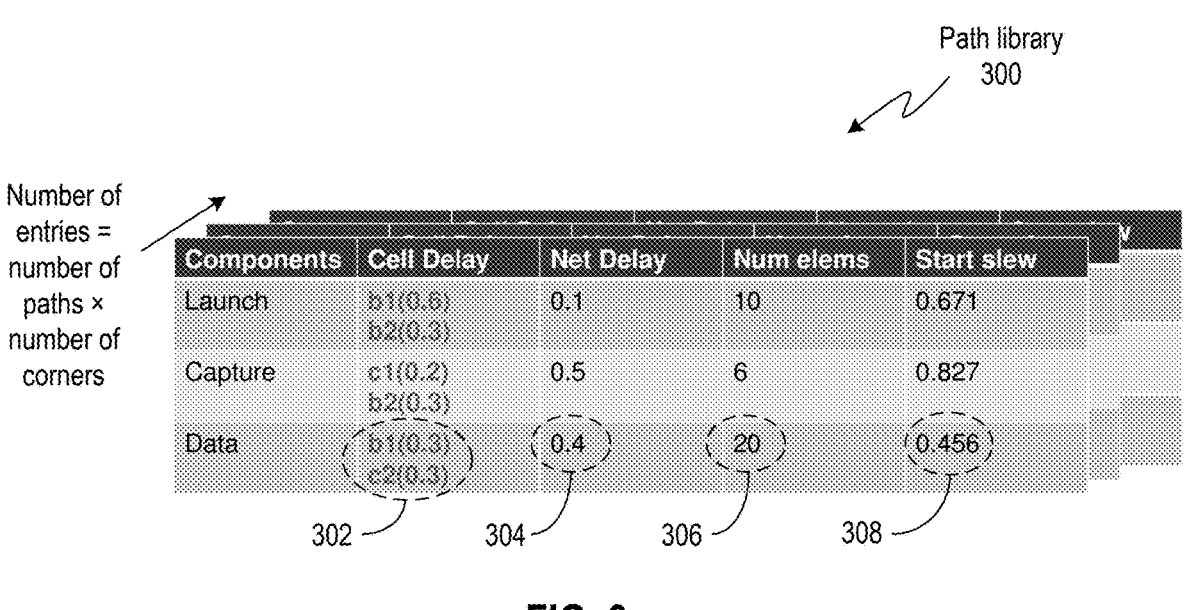
FIG. 3 illustrates a path library in accordance with some embodiments described herein.

FIG. 3 illustrates a path library in accordance with some embodiments described herein.

Path library 300 may include an entry for each path and each corner. Thus, the number of entries in path library 300 may be equal to the product of the number of paths and the number of corners. For a given path and corner, the path library 300 may include the feature values associated with the different components. Examples of components of a timing path include, but are not limited to, a launch component (which corresponds to the launch clock path), a capture component (which corresponds to the capture clock path), and a data component (which corresponds to the data path between the launch register and the capture register). Each component may include one or more component features, and each component feature may have a value. As shown in FIG. 3, the data path may include multiple features, which may include, but are not limited to, cell delay 302, net delay 304, number of elements 306, and start slew 308. The path library 300 may be generated once and be used for multiple STA runs.

Referring to FIG. 2, the dominant corner may be selected (at 204) for the analysis type based on the path library. The dominant corner may be the corner which is the worst corner for the greatest number of paths in the path library 300. For example, a counter may be created for each corner. For each path in the first set of paths, the worst corner may be identified, and the corresponding counter may be incremented. The corner with the largest counter value may be identified as the dominant corner. In case of a tie, one of the corners may be selected as the dominant corner or all the corners may be identified as the dominant corner.

A full timing analysis may be performed for the dominant corner (at 206) to obtain complete timing results for the dominant corner (i.e., timing results for all paths in the IC design as opposed to timing results for only the first set of paths). Performing STA for all paths in the IC design for the dominant corner may not be computationally costly because a single STA run is performed for a single corner (the dominant corner) and not multiple STA runs for multiple corners.

The embodiments may determine the timing signoff status (at 208), i.e., the embodiments may determine how close the IC design is to signoff based on the results from the dominant corner. This determining, in turn, allows the embodiments to set an aggressiveness level for calculating predictions. Specifically, in some embodiments described herein, the analysis aggressiveness level may be set to a level that maintains a consistent TNS error percentage.

Figure 4:
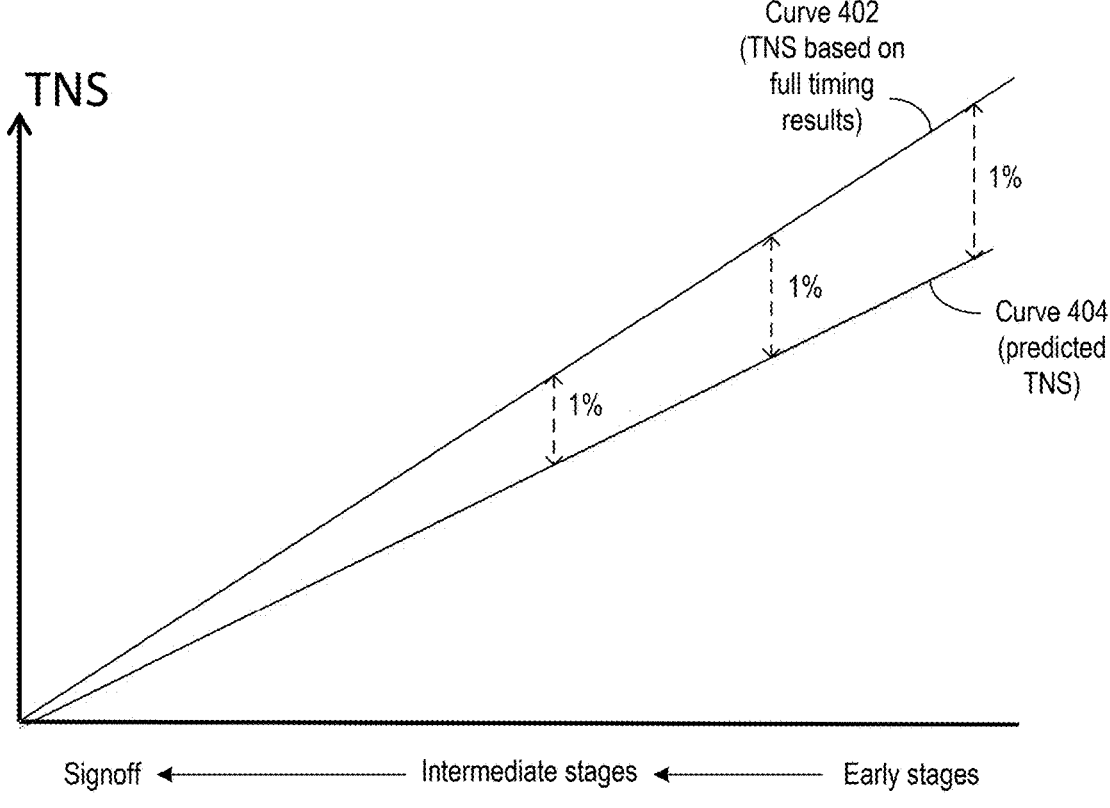
FIG. 4 illustrates a plot of the total negative slack (TNS) versus design stages in accordance with some embodiments described herein.

FIG. 4 illustrates a plot of the TNS versus design stages in accordance with some embodiments described herein.

The X-axis may represent the stages in an IC design flow and the Y-axis may represent the TNS in the IC design. As shown, the analysis aggressiveness level may be set to a level that maintains a difference of 1% between the TNS calculated using the full timing results and the TNS predicted by embodiments described herein. In some embodiments described herein, the analysis aggressiveness level may be determined using machine learning or a heuristic that is trained based on data collected from many IC designs. Specifically, embodiments may determine the timing signoff status (at 208) by computing the TNS value based on the complete timing results for the dominant corner (computed at 206). An aggressiveness level may be determined based on the TNS value. Specifically, the aggressiveness level may be higher when the magnitude of the TNS is large, and the aggressiveness level may be lower when the magnitude of the TNS is small. As shown in FIG. 4, the TNS may be large in early stages of the IC design flow and accordingly the aggressiveness level may be higher in early stages of the IC design flow, and the TNS may be small in later stages of the IC design flow and accordingly the aggressiveness level may be lower in later stages of the IC design flow.

A second set of paths may be gathered for analysis using the dominant corner timing results (at 210). In some embodiments described herein, the second set of paths may cover or pass through each pin in the IC design. In some embodiments described herein, a graph-based analysis may be performed to determine areas in the IC design which are likely to have their worst timing from the dominant corner. In some embodiments, these areas in the IC design may be excluded from the second set of paths. In some embodiments described herein, it may not be possible to analyze all paths in the remaining parts of the circuit. In these embodiments, the second set of paths may be chosen that provides good coverage of the remaining parts of the IC design.

In some embodiments described herein, the path gathering process may select a technique for gathering paths based on the aggressiveness level. For example, if the aggressiveness level corresponds to conservative mode (i.e., the aggressiveness level is low), then the embodiment may select a path gathering technique which densely covers the IC design. On the other hand, if the aggressiveness level corresponds to an aggressive mode (i.e., the aggressiveness level is high), then the embodiment may select a path gathering technique that provides sparse coverage, e.g., the technique may select the worst path per timing endpoint.

A per-path analysis may be performed (at 214) for each path in the second set of paths that were gathered previously (at 210). In the per-path analysis, a given path may be divided into a set of components. For each component, the component features may be extracted. Matching entries in path library 212 may be identified. A matching entry is an entry in which both the components and the component features match within a given tolerance limit. For example, the extracted component features for a given path may be as follows:

| | |
|---|---|
| Launch<br>Clock path | Lib_cell contribution: inv1(0.4) buf1(0.4) and1(0.2)<br>Path_len: 10<br>Cell delay/net_delay: 4.2 |
| Data path | Lib_cell contribution: buf1(0.8) inv1(0.2)<br>Path_len: 20<br>Cell delay/net_delay: 3.2 |
| Constraint | Lib_cell: FF1<br>Clk_pin_slew: 0.2<br>Data_pin_slew: 0.2 |
| Capture<br>clock path | Lib_cell contribution: buf1(0.2) inv1(0.8)<br>Path_len: 8<br>Cell delay/net_delay: 3.6 |

A set of M experiments (e.g., using a Monte Carlo simulation) may be performed on the path. In Monte Carlo simulation may refer to a process which uses repeated random sampling to determine a distribution for a desired numerical value. The term "experiment" may refer to a single iteration (which corresponds to a single random sampling) of a Monte Carlo simulation. Specifically, the experiments may allocate enough samples per component (which may be selected randomly) to obtain an accurate estimate for the worst corner. In some embodiments described herein, the number of samples may be allocated based per component based on the component's contribution to slack. For example, if there are 192 experiments, then the components may be divided as follows:

| Component | Value (ns) | Num Samples |
|---|---|---|
| launch clock path | 8 | 4 |
| data path | 7.5 | 4 |
| constraint | 2.6 | 2 |
| Capture clock path | 11.9 | 6 |

A nearest neighbor analysis may then be used to identify N similar components in the path library. For example, consider the following constraint:

| | |
|---|---|
| Original<br>Constraint | Lib_cell: FF1<br>Clk_pin_slew: 0.2<br>Data_pin_slew: 0.2 |

If two similar components are desired to be identified in the path library, then constraint1 and constraint3 may be identified in the path library as shown below (constraint1 and constraint3 have an asterisk appended to indicate that these constraints were identified). These two constraints may be selected because they are nearest to the original constraint shown above.

| | |
|---|---|
| Constraint1 * | Lib_cell: FF1<br>Clk_pin_slew: 0.3<br>Data_pin_slew: 0.2 |
| Constraint2 | Lib_cell: FF2<br>Clk_pin_slew: 0.4<br>Data_pin_slew: 0.6 |

-continued

| | |
|---|---|
| Constraint3* | Lib_cell: FF1<br>Clk_pin_slew: 0.2<br>Data_pin_slew: 0.3 |
| Constraint4 | Lib_cell: FF1<br>Clk_pin_slew: 0.3<br>Data_pin_slew: 0.3 |

For each component sample, the embodiments may calculate a scale factor for each non-dominant corner. For example, the following scale factors may be determined for constraint1 and constraint3 shown above:

| Constraint1 | | |
|---|---|---|
| Corner | Value | Scale Factor |
| Cmax (dominant) | 20 | NA |
| Cmin | 5 | 0.25 |
| Ctyp | 10 | 0.5 |

| Constraint3 | | |
|---|---|---|
| Corner | Value | Scale Factor |
| Cmax (dominant) | 12 | NA |
| Cmin | 4 | 0.33 |
| Ctyp | 8 | 0.66 |

In the above example, corner Cmax is the dominant corner, and corners Cmin and Ctyp are the non-dominant corners. The scale factors may then be used to calculate a set of expected values for each component. For example, if the value in the original constraint was 10, then the embodiments may generate the following expected values in the two samples corresponding to constraint1 and constraint3 for the non-dominant corners:

| | | |
|---|---|---|
| Sample1 | Cmin, Ctyp | 2.5, 5 |
| Sample2 | Cmin, Ctyp | 3.3, 6.6 |

Computing expected values for the components for the non-dominant corners (e.g., by using scale factors as shown above) may be extremely fast and use substantially less computation than performing a full STA run on each non-dominant corner. Multiple experiments may be performed, where each experiment may involve calculating a slack for all non-dominant corners. In some embodiments described herein, the number of experiments may be equal to the product of the number of launch samples, the number of data samples, the number of constraint samples, and the number of capture samples. Thus, if there are four launch samples, four data samples, two constraint samples, and six capture samples, then the total number of experiments may be $4 \times 4 \times 2 \times 6 = 192$.

Each time an experiment is run, the worst corner may be recorded, which keeps track of the number of times that each corner was recorded as the worst. For example, in the 192 experiment example shown above, the Cmax corner may have been recorded as the worst corner in 130 experiments, the Ctyp corner may be have been recorded as the worst corner in 62 experiments, and the Cmin corner may have been recorded as the worst corner in 0 experiments. Based on this data, it is likely that Cmax is the worst corner, Ctyp has a reasonable probability of being the worst corner, and it is very unlikely that Cmin is the worst corner. Depending on the aggressiveness level of the analysis, the embodiments may select one or more corners. For example, in the most aggressive setting (i.e., highest aggressiveness level), the embodiment may select the corner that was recorded as the worst corner in the greatest number of experiments (e.g., Cmax in the above example). In a less aggressive setting (i.e., a lower aggressiveness level), the embodiment may select multiple corners that were recorded as the worst corner in a significant number of experiments (e.g., Cmax and Ctyp in the above example). Once the corner marking has been determined, all objects (which may include, but are not limited to pins, cells, and nets) on the path may be marked with the corner markings (each path in the second set of paths may be analyzed during per-path analysis 214).

Some embodiments described herein may allocate resources based on the corner markings. Specifically, once the corner marking process is completed during per-path analysis 214, the embodiments may determine the computational resources that are expected to be used for performing timing analysis on non-dominant corners. Specifically, the embodiments may create jobs for performing timing analysis for subsets of corners, such that the jobs are expected to have approximately the same workload, which can reduce the overall runtime. For example, consider the following situation:

| Corner | % of pins marked for this corner |
|---|---|
| cmin | 25 |
| ctypical | 45 |
| rcmax | 5 |
| rcmin | 2 |

In the above example, two jobs—Job1 and Job2—may be created. Job1 may perform timing update for corner ctypical, whereas Job2 may perform timing update for corners rcmax, cmin, and rcmin. Once evenly sized jobs have been created, the embodiments may then request a host for executing each job in a compute farm.

Figure 5:
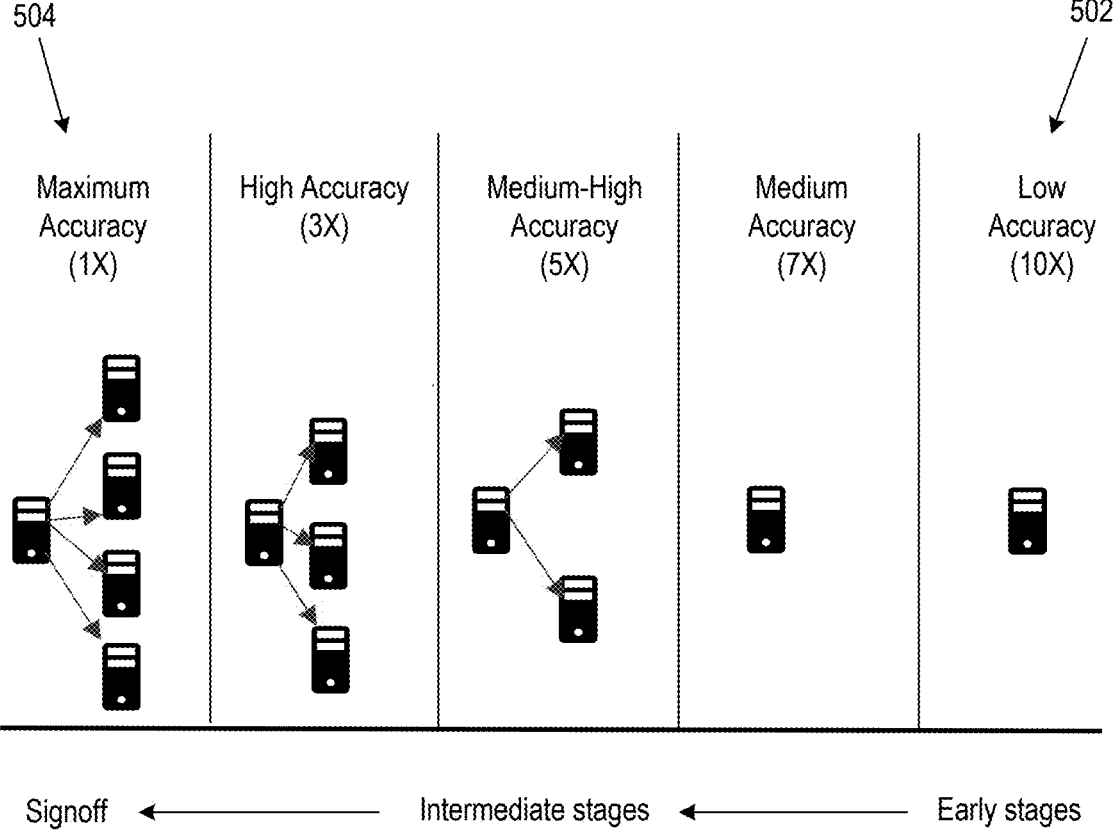
FIG. 5 illustrates the computational resources used during different design flow stages in accordance with some embodiments described herein.

FIG. 5 illustrates the computational resources used during different design flow stages in accordance with some embodiments described herein.

The X-axis may represent the stages in an IC design flow. As shown in the figure, few computation resources may be used in early stages, and progressively more computational resources may be used as the IC design progresses toward signoff. For example, in an early stage, only a single node may be used because the level of aggressiveness is high (at 502). In a late stage, multiple compute nodes may be used because the level of aggressiveness is low (at 504). Embodiments described herein may trade-off between accuracy and speedup. As the aggressiveness level increases, the accuracy of the results (e.g., timing) may decrease but the computational speedup may increase. For example, a low aggressiveness level may provide high accuracy and may use a large amount of computational resources (at 504). A high aggressiveness level may provide low accuracy and use a small amount of computational resources (at 502), which is shown as a speedup (e.g., 10×) with respect to the maximum accuracy case.

Referring back to FIG. 2, timing may be updated for non-dominant corners (at 216). Specifically, graph-based analysis may be performed on the non-dominant corners. When analyzing each corner, timing information may be propagated in objects that are marked with the corner. Any subsequent reporting commands may also respect this marking. Results obtained from IC designs used in the semiconductor industry have shown that embodiments described herein can speedup multi-corner STA by 3 to 12 times.

FIG. 6 illustrates a process for performing sign-off safe multi-corner STA in accordance with some embodiments described herein.

A first set of timing paths may be selected in an IC design (at 602). A first set of timing slack values and a first set of path component feature values may be calculated for the first set of timing paths across a first set of corners (at 604). The first set of path component feature values for the first set of timing paths may be stored in a path library (at 606), e.g., path library 212 in FIG. 2. A dominant corner in the first set of corners may be selected based on the first set of timing slack values (at 608).

A second set of timing slack values may be determined for a second set of timing paths in the IC design for the dominant corner (at 610). Specifically, timing slacks may be determined for the entire IC design for the dominant corner and a second set of timing paths may be selected in the IC design, e.g., the second set of paths (at 210) gathered in FIG. 2. In some embodiments, the count of timing paths in the first set of timing paths may be substantially less than the count of timing paths in the second set of timing paths. For example, the first set of timing paths may include a few thousand timing paths, whereas the second set of timing paths may include a few million timing paths.

A third set of timing slack values may be estimated for the second set of timing paths across non-dominant corners in the first set of corners based on matching a second set of path component feature values of the second set of timing paths with the first set of path component feature values stored in the path library (at 612), e.g., by performing per-path analysis (at 214) in FIG. 2.

A second set of corners (e.g., worst corners) may be selected for each timing path in the second set of timing paths based on the third set of timing slack values (at 614). In some embodiments described herein, the count of corners selected for a timing path may depend on the estimated timing slack values across the different corners and the aggressiveness level. Specifically, at lower aggressiveness levels a greater number of corners may be selected, and at higher aggressiveness levels a fewer number of corners may be selected. Additionally, a greater number of corners may be selected if multiple timing slack values are numerically close to the worst timing slack across the different corners, and a fewer number of corners may be selected if the estimated timing slack values are spread over a large numerical range across the different corners (i.e., the second worst timing slack is not numerically close to the worst timing slack value, and so forth).

In some embodiments described herein, a cost function may be used to select the second set of corners, where the cost function may use multiple factors. In some embodiments, the cost function may be represented as follows:

$$\text{Cost}(\text{corner}) = a \times (\text{The\_Worst\_Slack}(\text{corner})) + b \times (\text{The\_Worst\_Frequency}(\text{corner})) + c \times (\text{The\_Average\_Slack}(\text{corner})) + d \times (\text{The\_Ranking\_Result}(\text{corner})).$$

The factor The_Worst_Slack (corner) may refer to the worst slack value during all experiments (e.g., during a Monte Carlo simulation) for a corner divided by the worst overall slack. The factor The_Worst_Frequency (corner) may refer to the probability of being the worst slack during all experiments for a given corner. The factor The_Average_Slack (corner) may refer to the average slack during all experiments for a corner divided by the worst overall average slack. The factor The_Ranking_Result (corner) may refer to the top N (e.g., top three) corners which have the most worst slack and may assign score to them during each experiment (0.5, 0.3, 0.2). The coefficients a, b, c, and d may be scaling factors which apply to all corners and may be determined by training based on a representative set of designs.

Circuit objects may be marked in each timing path in the second set of timing paths with the second set of corners corresponding to the timing path (at 616). In other words, if corners S2 and S4 are selected for path P1 in the second set of paths, then circuit objects in path P1 may be marked with corners S2 and S4. If a circuit object has already been marked with a corner, then the circuit object may not be marked with the corner again. However, if the circuit object has not been marked with the corner, then the circuit object is marked with the corner (e.g., the corner is added to the second set of corners associated with the circuit object).

Timing information for non-dominant corners may then be updated using the corner markings. Specifically, timing information for a corner (e.g., corner S2) may be propagated using a graph-based technique to only those circuit objects that are marked with the corner (e.g., corner S2).

Specifically, each pin of a circuit object may be associated with a set of timing values, where each timing value corresponds to a corner. In some embodiments described herein, each pin may be associated with a data structure that can store a timing value corresponding to each corner in the first set of corners. For example, the pins of gate 112 may store timing values corresponding to corners S4 and S2, the pins of gate 116 may store a timing value corresponding to corner S4, and the pins of gate 118 may store timing values corresponding to corners S4, S2, and S9. If timing is propagated from inputs-to-outputs, then the timing value (e.g., an arrival time) corresponding to corner S4 may be propagated from the output pin of gate 116 to the top input pin of gate 112. The output pin of gate 118 may have timing values associated with corners S4, S2, and S9. The timing values corresponding to corners S4 and S2 (but not S9) may be propagated to the bottom input pin of gate 112 because gate 112 is marked with corners S2 and S4 but is not marked with corner S9. Only propagating timing values associated with the marked corners in the IC design may substantially reduce the amount of computation performed for performing signoff-safe multi-corner STA.

In some embodiments described herein, signal integrity impacts can be accounted for by determining a set of aggressors which impact timing slacks in the dominant corner. The longest and shortest paths may be traced to the set of aggressors. Each set of aggressor timing paths may be marked with the worst corners (e.g., the second set of corners) that were marked on the corresponding aggressor.

In some embodiments, the estimation accuracy may be traded-off with runtime by selecting multiple dominant corners during the initial phase of analysis. For example, in some embodiments, multiple dominant corners may be selected during dominant corner selection (at 204 in FIG. 2). The full timing analysis (at 206 in FIG. 2) for each of the multiple dominant corners may be performed in parallel. Selecting multiple dominant corners may increase the runtime due to the additional computational cost of performing full timing analysis on multiple corners. At the same time, accuracy may improve since we will have more coverage for corners and estimation with the path library can also improve.

In some embodiments described herein, the set of dominant corners may be selected using an adaptive process. A set of top-m critical path based analysis (PBA) paths or graph based analysis (GBA) end-points may be identified individually across all n-corners. The critical paths or end-points may be collected into a single set and duplicates may be removed. The following steps may be performed on the critical paths or end-points.

a. The arrivals/slacks for the critical paths or end-points may be computed at each of the n-corners.

b. Add all corners to the non-anchor corner set $\rightarrow \varnothing$.

c. Start with the corner that has the highest correlation (Pearson's correlation coefficient) with all other corners and add it to the dominant corner collection, $\{c_1\}=\rightarrow T$.

d. Train an ML algorithm (Boosted Trees or Multi-layer-perceptron MLP) with the dominant corner set data in T to predict arrivals in the non-dominant corners.

e. Use ML to predict path/end-point arrivals of all non-anchor corners in $\Phi$.

f. Pick the least accurate non-anchor corner of accuracy $\delta 1$ and add it to the dominant corner set, $\{c_2\}=\rightarrow T$.

g. Repeat the algorithm until we reach the ML-accuracy threshold of the user ($\delta > \mu_{user}$) or the maximum number of anchor corners $\{c_1, c_2, c_3, \ldots, c_{max}\}$ are Reached.

In some embodiments accuracy may be traded-off with runtime by speeding up the calculation of the non-dominant corners using an ML model for delay calculation. For example, in some embodiments described herein, the ML model may use the delay calculation results from the full timing calculations from the dominant corner analysis to estimate the delay calculation results for the non-dominant corner analysis. Specifically, in some embodiments, for the rest of the 'n–m' corners $\{C_i, i=1 \ldots n-m\}$, a ML model may be queried to determine if the predicted delay for a corner has an error less than $\pm \delta$ ps (which may be modelled as a binary classification problem, i.e., a 0 or 1 problem). If the binary classification returns a 1 (which may correspond to the error being less than $\pm \delta$ ps), then an ML-based prediction model may be queried which may provide the interpolated delay.

In some embodiments, the features used for constructing the ML models may include one or more of: input waveform, slew, load net res, load net cap, load net coupling cap, drive strength, and number of aggressors. A different set of features may be used for different corners. In other words, two ML models may be used in some embodiments described herein. Each ML model may be implemented using a neural net or a boosted tree. A first ML model may be trained for predicting if the corner delay is within an error threshold, and a second ML model may be trained to predict the value of the corner delay.

Once the timing values are propagated across the IC design, the timing values may be used in subsequent processing. For example, the timing values (e.g., timing slacks) may be used to identify violating timing paths or to compute timing metrics, e.g., TNS.

Figure 7:
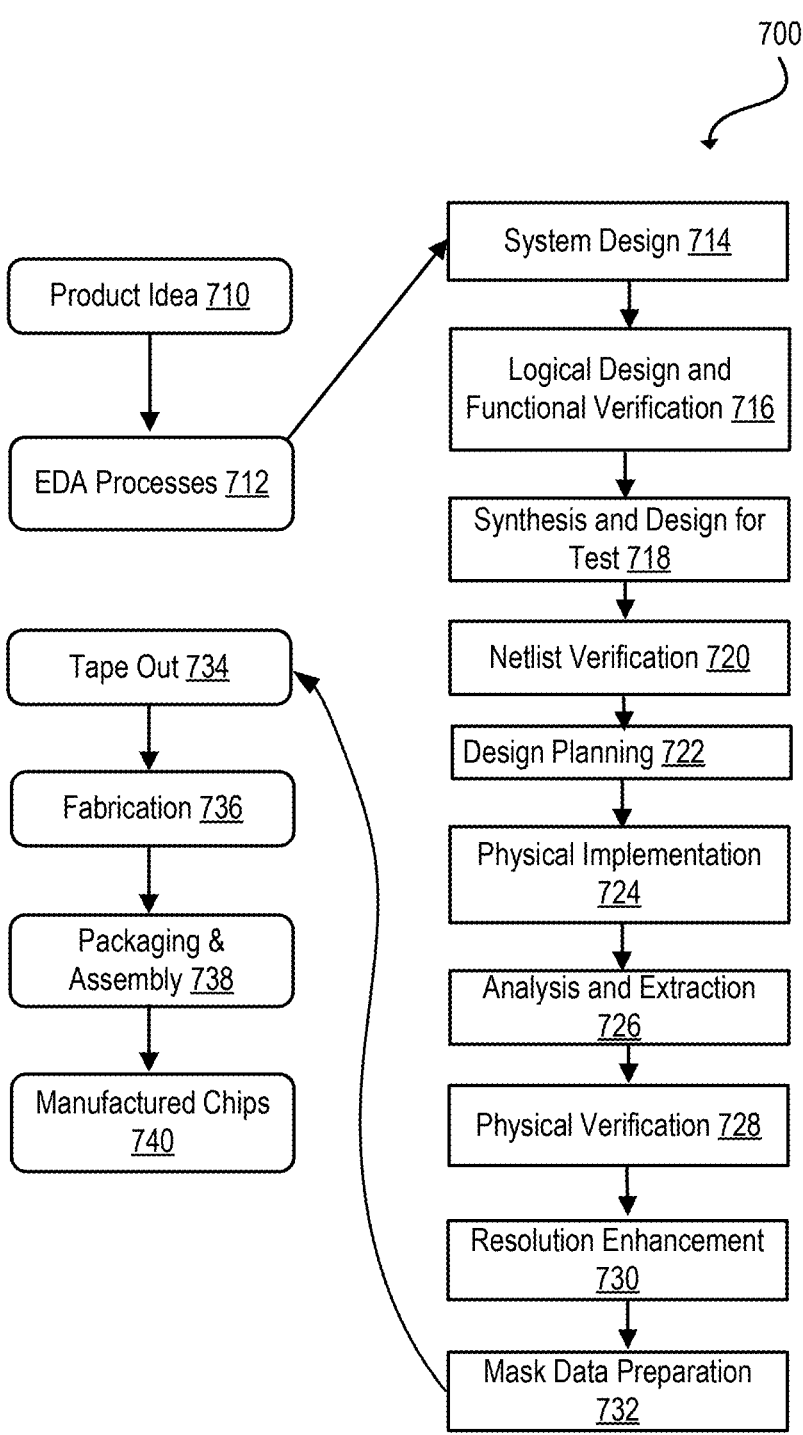
FIG. 7 illustrates an example flow for the design, verification, and fabrication of an integrated circuit in accordance with some embodiments described herein.

FIG. 7 illustrates an example flow 700 for the design, verification, and fabrication of an integrated circuit in accordance with some embodiments described herein. EDA processes 712 (the acronym "EDA" refers to "Electronic Design Automation") can be used to transform and verify design data and instructions that represent the integrated circuit. Each of these processes can be structured and enabled as multiple modules or operations.

Flow 700 can start with the creation of a product idea 710 with information supplied by a designer, information which is transformed and verified by using EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly 738 are performed to produce the manufactured IC chip 740.

Specifications for a circuit or electronic structure may range from low-level transistor material layouts to high-level description languages. A high-level of representation may be used to design circuits and systems, using a hardware description language ("HDL") such as VHDL, Verilog, System Verilog, SystemC, MyHDL or OpenVera. The HDL description can be transformed to a logic-level register transfer level ("RTL") description, a gate-level description, a layout-level description, or a mask-level description. Each lower representation level that is a more concrete description adds more detail into the design description. The lower levels of representation that are more concrete descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
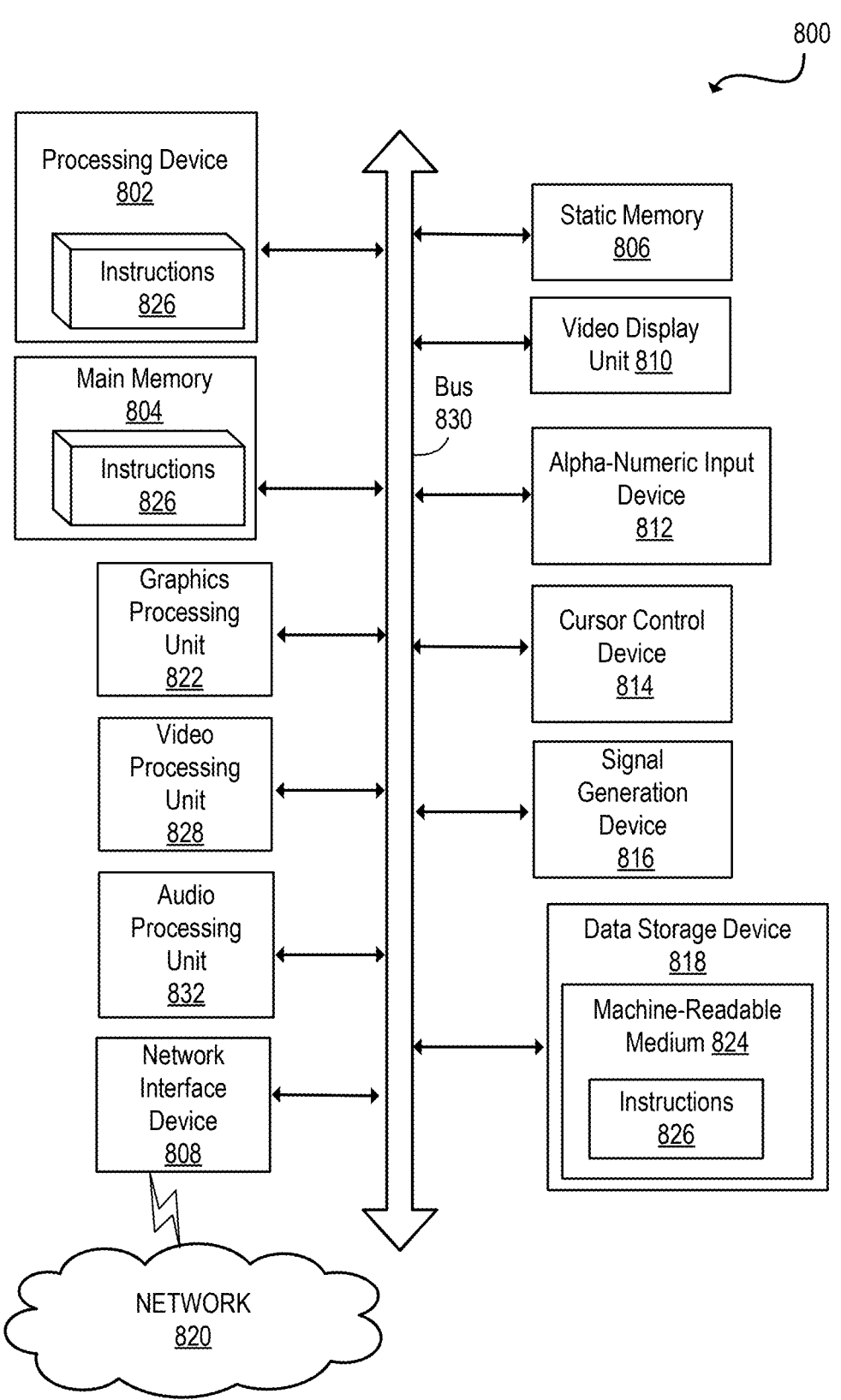
FIG. 8 illustrates an example machine of a computer system within which a set of instructions, for causing the machine to perform any one or more of the methodologies discussed herein, may be executed.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:

selecting a first set of timing paths in an integrated circuit (IC) design;

calculating a first set of timing slack values and a first set of path component feature values for the first set of timing paths across a first set of corners;

storing the first set of path component feature values for the first set of timing paths in a path library;

selecting a dominant corner in the first set of corners based on the first set of timing slack values;

determining a second set of timing slack values for a second set of timing paths in the IC design for the dominant corner;

estimating a third set of timing slack values for the second set of timing paths across non-dominant corners in the first set of corners based on matching a second set of path component feature values of the second set of timing paths with the first set of path component feature values stored in the path library;

selecting a second set of corners for each timing path in the second set of timing paths based on the third set of timing slack values; and marking, by a processor, circuit objects in each timing path in the second set of timing paths with the second set of corners corresponding to the timing path.

2. The method of claim 1, further comprising propagating timing information to a circuit object in the IC design for corners marked for the circuit object.

3. The method of claim 1, further comprising determining an aggressiveness level based on the second set of timing slack values, and wherein the second set of corners are selected based on the third set of timing slack values and the aggressiveness level.

4. The method of claim 3, wherein the second set of corners includes more corners when the aggressiveness level is low than when the aggressiveness level is high.

5. The method of claim 1, wherein the second set of corners is selected using a cost function.

6. The method of claim 1, wherein the second set of timing paths includes a greater number of timing paths than the first set of timing paths.

7. The method of claim 1, wherein the estimating the third set of timing slack values comprises:

using a first machine learning model to determine a first result which indicates whether an error in a first timing slack value in the third set of timing slack values is less than a threshold value; and determining to use a second machine learning model based on the first result, wherein the second machine learning model predicts the first timing slack value in the third set of timing slack values.

8. A non-transitory computer-readable medium comprising stored instructions, which when executed by a processor, cause the processor to:

select a first set of timing paths in an integrated circuit (IC) design;

calculate a first set of timing slack values and a first set of path component feature values for the first set of timing paths across a first set of corners;

store the first set of path component feature values for the first set of timing paths in a path library;

select a dominant corner in the first set of corners based on the first set of timing slack values;

determine a second set of timing slack values for a second set of timing paths in the IC design for the dominant corner;

estimate a third set of timing slack values for the second set of timing paths across non-dominant corners in the first set of corners based on matching a second set of path component feature values of the second set of timing paths with the first set of path component feature values stored in the path library;

select a second set of corners for each timing path in the second set of timing paths based on the third set of timing slack values; and mark circuit objects in each timing path in the second set of timing paths with the second set of corners corresponding to the timing path.

9. The non-transitory computer-readable medium of claim 8, wherein the instructions further cause the processor to propagate timing information to a circuit object in the IC design for corners marked for the circuit object.

10. The non-transitory computer-readable medium of claim 8, wherein the instructions further cause the processor to determine an aggressiveness level based on the second set of timing slack values, and wherein the second set of corners are selected based on the third set of timing slack values and the aggressiveness level.

11. The non-transitory computer-readable medium of claim 10, wherein the second set of corners includes more corners when the aggressiveness level is low than when the aggressiveness level is high.

12. The non-transitory computer-readable medium of claim 8, wherein the second set of corners is selected using a cost function.

13. The non-transitory computer-readable medium of claim 8, wherein the second set of timing paths includes a greater number of timing paths than the first set of timing paths.

14. The non-transitory computer-readable medium of claim 8, wherein the estimating the third set of timing slack values comprises:

using a first machine learning model to determine a first result which indicates whether an error in a first timing slack value in the third set of timing slack values is less than a threshold value; and determining to use a second machine learning model based on the first result, wherein the second machine learning model predicts the first timing slack value in the third set of timing slack values.

15. An apparatus, comprising:

a memory storing instructions; and a processor, coupled with the memory and to execute the instructions, the instructions when executed causing the processor to:

select a first set of timing paths in an integrated circuit (IC) design;

calculate a first set of timing slack values and a first set of path component feature values for the first set of timing paths across a first set of corners;

store the first set of path component feature values for the first set of timing paths in a path library;

select a dominant corner in the first set of corners based on the first set of timing slack values;

determine a second set of timing slack values for a second set of timing paths in the IC design for the dominant corner, wherein the second 14 set of timing paths includes a greater number of timing paths than the first 15 set of timing paths;

estimate a third set of timing slack values for the second set of timing paths across non-dominant corners in the first set of corners based on matching a second set of path component feature values of the second set of timing paths with the first set of path component feature values stored in the path library;

select a second set of corners for each timing path in the second set of timing paths based on the third set of timing slack values; and mark circuit objects in each timing path in the second set of timing paths with the second set of corners corresponding to the timing path.

16. The apparatus of claim 15, wherein the instructions further cause the processor to propagate timing information to a circuit object in the IC design for corners marked for the circuit object.

17. The apparatus of claim 15, wherein the instructions further cause the processor to determine an aggressiveness level based on the second set of timing slack values, and wherein the second set of corners are selected based on the third set of timing slack values and the aggressiveness level.

18. The apparatus of claim 17, wherein the second set of corners includes more corners when the aggressiveness level is low than when the aggressiveness level is high.

19. The apparatus of claim 15, wherein the second set of corners is selected using a cost function.

20. The apparatus of claim 15, wherein the estimating the third set of timing slack values comprises:

using a first machine learning model to determine a first result which indicates whether an error in a first timing slack value in the third set of timing slack values is less than a threshold value; and determining to use a second machine learning model based on the first result, wherein the second machine learning model predicts the first timing slack value in the third set of timing slack values.

* * * * *